A. M. LAYCOCK.
DRIVING AXLE.
APPLICATION FILED OCT. 9, 1915.
1,236,949.
Patented Aug. 14, 1917.
2 SHEETS—SHEET 2.
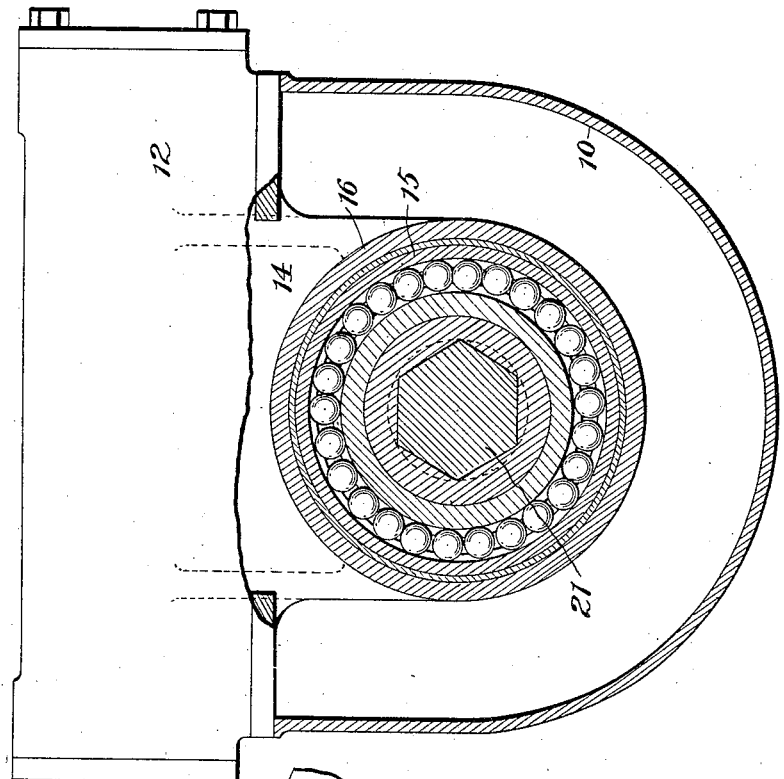
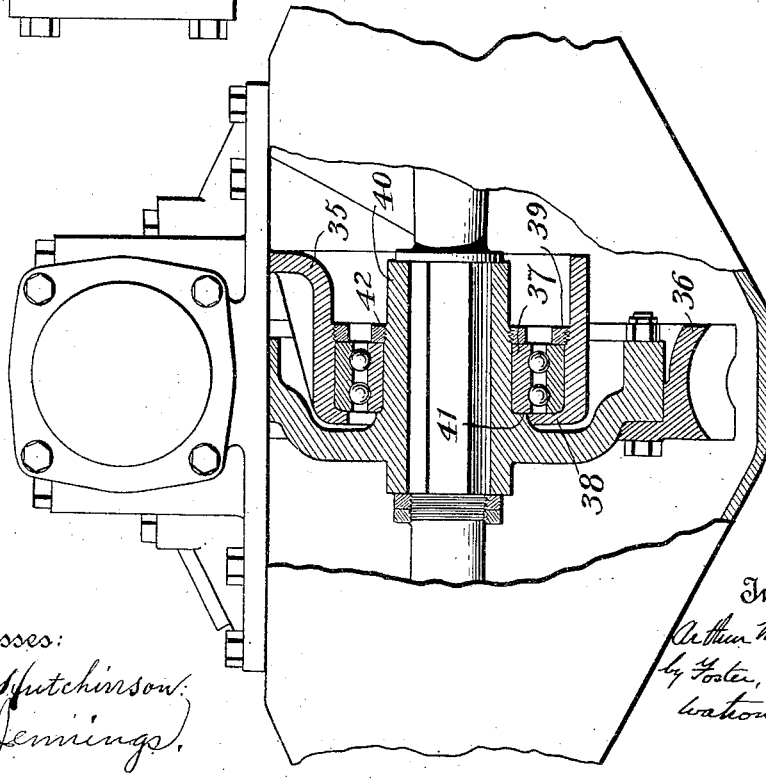
Witnesses:
Jas. E. Hutchinson
H. P. Jennings
Inventor
Arthur M. Laycock
by Foster, Freeman,
Watson & Coit.
Attorneys

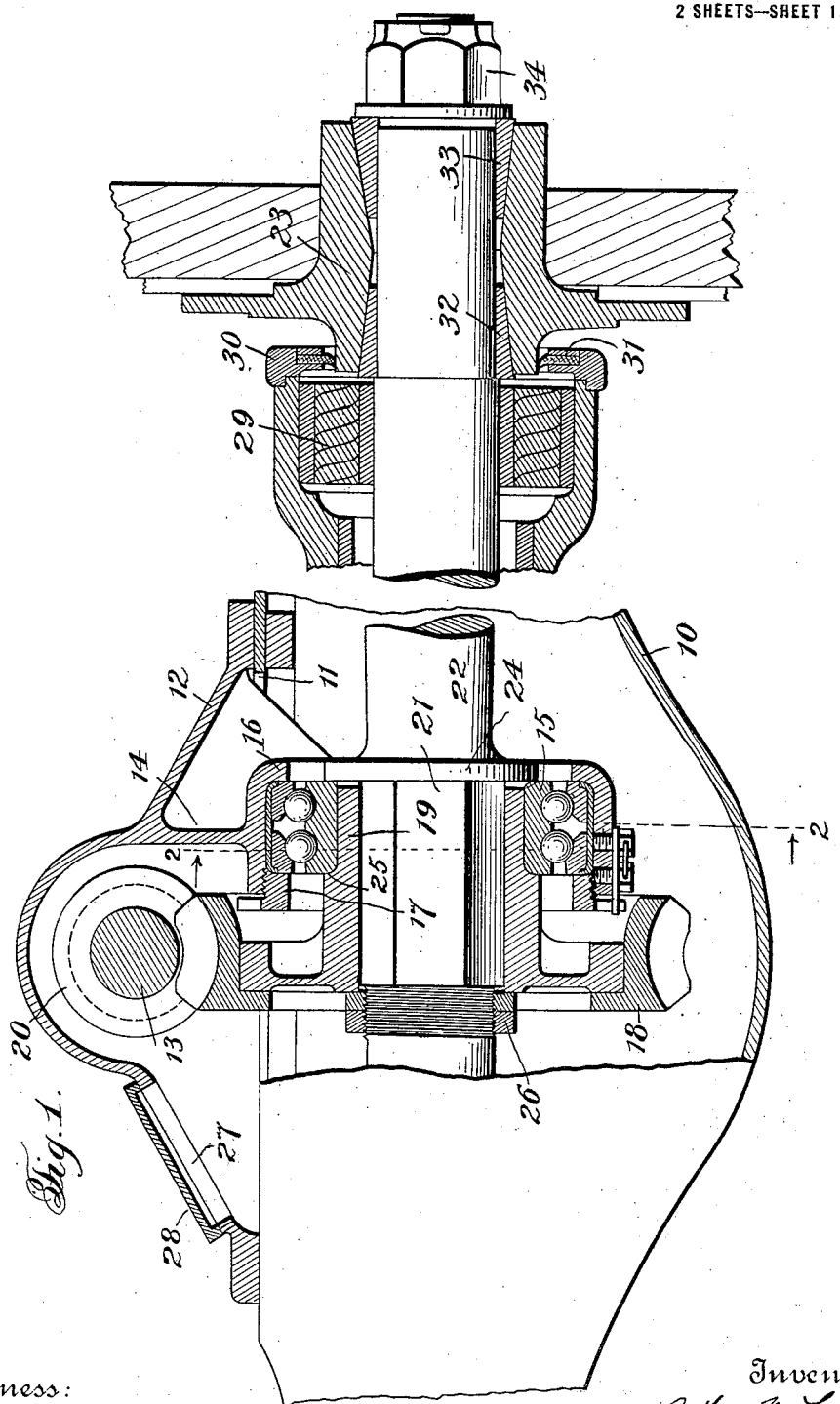

UNITED STATES PATENT OFFICE.

ARTHUR MAUNDER LAYCOCK, OF KINGSTON, PENNSYLVANIA.

DRIVING-AXLE.

1,236,949.      Specification of Letters Patent.      Patented Aug. 14, 1917.

Application filed October 9, 1915. Serial No. 55,058.

*To all whom it may concern:*

Be it known that I, ARTHUR M. LAYCOCK, a subject of the King of Great Britain, and resident of Kingston, county of Luzerne, State of Pennsylvania, have invented certain new and useful Improvements in Driving-Axles, of which the following is a specification.

This invention relates to motor vehicles and more particularly to the driving axles thereof.

It has heretofore been the practice to provide motor vehicles with differential mechanism in the driving axle and to mount the wheels at the end of the tubular axle and connect them with the differential mechanism by shaft sections, the wheels being held against axial movement by means of suitable thrust bearings between them and the tubular housing. It has been found from experience with trucks which travel over unpaved roads or roads which are otherwise in bad condition that when the truck becomes stalled with one of its driving wheels on firm ground and the other upon a comparatively slippery place, efforts to start the truck by means of its motor result in spinning the wheel which is on the slippery place, while the opposite wheel becomes stationary. The spinning of one of the wheels subjects the tire thereon to very severe wear and it is practically impossible to start the truck, under these conditions, in the usual manner.

It is the object of the present invention to provide a vehicle driving axle in which the wheels are rigidly coupled together and driven in unison and in which the wheels are rigidly secured on the ends of the driving shafts and the axial thrust of the wheels taken by the bearing or bearings for the driving gear which rotates the shafts.

Other objects and the features of novelty will be apparent from the following description taken in connection with the accompanying drawings, in which, Figure 1 is a longitudinal section through a portion of a vehicle driving axle embodying my invention, certain portions of the axle being broken away;

Fig. 2 is a transverse section on the line 2—2 of Fig. 1;

Fig. 3 is a fragmentary section, similar to Fig. 1 and showing another form of invention.

Referring to the drawings, 10 indicates the usual tubular housing or stationary axle and in the form of the invention shown this housing has an opening 11 in its upper side, which opening is closed by the member 12. The member 12 carries the usual propeller shaft 13 and has integrally formed therewith a bracket 14, which projects into the housing 10 and supports the roller bearing 15, an inturned flange 16 and a nut 17, on the bracket 14, coöperating to hold this bearing against axial movement. A gear wheel 18 has its hub 19 arranged in the bearing 15 so as to be rotatably supported thereby. The wheel 18 may be of any preferred form and is shown as a worm gear with which a worm 20 on the shaft 13 meshes.

The gear wheel 18 is preferably provided with an axial opening through its hub, of angular cross section and in the form of the invention illustrated this opening is shown as fitting the hexagonal enlargement 21 of the driving shaft 22 which extends through the housing 10 and has wheels 23 rigidly secured thereon in any suitable manner. In Fig. 1 but one of the wheels 23 is shown and it will be understood that another wheel 11 will be mounted on the opposite end of the shaft. The shaft 22 has a collar 24 adjacent the end of the hub 19 of the gear 18, this collar engaging the inner ring of the bearing 15 and coöperating with a shoulder 25 on the hub 19 to rigidly secure the hub to the bearing and prevent axial movement of the gear wheel 18. One or more nuts 26 are arranged on the shaft 22 at the opposite end of the hub 19 and coöperates with the collar 24 to secure the shaft 22 to the gear wheel. It will be seen that by the above described construction the shaft 22 is so connected that the gear 18 has to be rotated directly thereby and all axial thrust in the shaft 22 will be taken by the bearing 15.

In order to give access to the interior of the housing 10 and particularly to the nuts 26, the member 12 is provided with an opening 27 which is closed by a suitable cover plate 28.

The opposite end portions of the shaft 22 are supported in the ends of the housing 10 by suitable roller bearings 29, these bearings, on account of the bearing 15 taking the thrust in the shaft 22, being of the radial type, and thus providing a very simple and comparatively inexpensive form of mounting for the shaft 22. Dust is excluded from the bearings 29 by suitable rings 30 secured on the ends of the housing 10 and having rings 31 of suitable flexible material, secured thereto and engaging the hubs of the wheels 23.

The ends of the shaft 22 project beyond the ends of the housing 10 and the wheels 23 are mounted on these projecting ends as by the opposed cones 32, 33, and suitable nuts 34 on the ends of the shaft, these nuts being adapted to force the cones 33 into the hubs of the wheels 23 and thus secure the wheels in position.

In the form of the invention shown in Fig. 3, the construction is substantially the same as that shown in Figs. 1 and 2 with the exception that the bracket 35 extends into the central plane of the gear wheel 36 so as to have the bearing 37 substantially in the central plane of the gear wheel. The bearing 37 is secured to the bracket 35 by means of the inner flange 38 and the nut 39 and is secured to the hub 40 of the gear wheel by means of the shoulder 41 and the nut 42. In this way the radial thrusts in the gear wheel 36 are taken by a bearing which is in the plane of these thrusts and therefore the bearing will not be subjected to as severe strains as in the construction shown in Fig. 1.

While I have illustrated my invention applied to a worm drive construction it will of course be understood that its use is not limited to that form.

Having described the invention what is claimed and desired to be secured by Letters-Patent is, 1. In a vehicle driving axle construction, a tubular housing, a shaft in said housing and projecting at one end thereof and carrying a wheel on the projecting portion, a radial roller bearing in the end of the housing for said shaft, driving and driven members in said housing, the driven member secured to said shaft for rotation therewith and held against axial movement relative thereto, a bracket projecting within the housing, a combined radial and thrust roller bearing carried by said bracket and supporting the shaft, and constituting the sole means for holding the driven member and shaft against axial movement.

2. In a vehicle driving axle, the combination of a tubular housing having an opening in one side thereof, a member secured on said housing closing said opening and provided with a bracket extending into the housing, a gear rotatably supported in said bracket and held against axial movement, a shaft extending through said gear and having a shoulder and nut coöperating to secure the shaft against axial movement relatively to the gear, a bearing supporting the outer end of said shaft in said housing, and a wheel rigidly secured on the end of said shaft.

3. In a vehicle driving axle, the combination of a tubular housing having an opening in one side thereof, a member secured on said housing closing said opening and provided with a bracket extending into the housing, a gear rotatably supported in said bracket and held against axial movement, a shaft extending through said gear and having its ends projecting beyond the ends of said housing, said shaft being secured to said gear so as to be rotated directly thereby and held against axial movement relatively thereto, bearings at the outer ends of said housing rotatably supporting said shaft, and wheels rigidly secured on the projecting ends of said shaft.

4. In a vehicle driving axle, the combination of a tubular housing having an opening in one side thereof, a member secured on said housing closing said opening and provided with a bracket extending into the housing, a roller bearing carried by said bracket and held against axial displacement, a gear rotatably supported by said bearing and held thereby against axial movement, a shaft extending through said gear and having its ends projecting beyond the ends of said housing, said shaft being secured to said gear so as to be rotated directly thereby and held against axial movement relatively thereto, bearings at the outer ends of said housing rotatably supporting said shaft, and wheels rigidly secured on the projecting ends of said shaft.

5. In a vehicle driving axle, the combination of a tubular housing having an opening in one side thereof, a member secured to said housing and provided with a bracket projecting into the housing, a roller bearing carried by said bracket, a gear supported by said bearing and having the medial plane of its teeth substantially co-incident with the medial plane of said bearing, and a shaft rotated by said gear.

6. In a vehicle driving axle, the combination of a housing, a gear member therein, a shaft member rotatably supported in said housing and projecting at an end thereof and rigidly connected with said gear so as to be rotated thereby and held against axial movement relative thereto, a wheel mounted on said projecting end of the shaft outside of the housing, a radial bearing at the end of the housing for the shaft, and a single radial and thrust roller bearing for said gear carried by the housing and constituting the sole means for holding said gear and shaft members against axial movement relative to said housing.

In testimony whereof I affix my signature.

ARTHUR MAUNDER LAYCOCK.

Copies of this patent may be obtained for five cents each, by addressing the "Commissioner of Patents, Washington, D. C."